Figure 1:
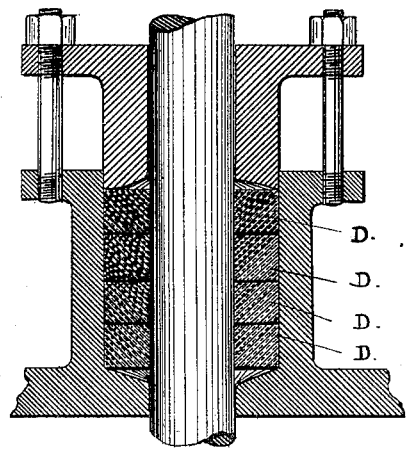

(No Model.) 2 Sheets—Sheet 1.

H. DODS.
PACKING FOR PISTON RODS.

No. 600,576. Patented Mar. 15, 1898.

Witnesses:
M. Wagner
E. Salomon

Inventor:
Henry Dods
By Smith & Osborn
his Attys.

THE NORRIS PETERS CO., PHOTO-LITHO., WASHINGTON, D. C.

(No Model.)

H. DODS.
PACKING FOR PISTON RODS.

No. 600,576.  Patented Mar. 15, 1898.

2 Sheets—Sheet 2.

Witnesses:
M. Regner
E. Salomon

Inventor:
Henry Dods
by Dwight Osborn, Atty.

UNITED STATES PATENT OFFICE.

HENRY DODS, OF VIRGINIA CITY, NEVADA.

PACKING FOR PISTON-RODS.

SPECIFICATION forming part of Letters Patent No. 600,576, dated March 15, 1898.

Application filed July 21, 1897. Serial No. 645,461. (No model.)

*To all whom it may concern:*

Be it known that I, HENRY DODS, a citizen of the United States, residing in Virginia City, Storey county, State of Nevada, have invented certain new and useful Improvements in Packing for Piston-Rods, of which the following is a specification.

This invention has for its object the production of an improved packing having several qualities and properties resulting from its peculiar manufacture that render it particularly useful for the piston-rods of steam-engines; but it will also be found applicable to plungers and all moving rods and parts of engines and machinery where a steam-tight or a water-tight joint is to be maintained. It will produce a tight joint without abundant or excessive friction upon the rod, it is pliable and compressible to a high degree, it has the property of retaining and preserving its elasticity and compressibility under wear, and it possesses very great durability.

To such end and object my said invention involves a particular method of producing the material for the manufacture of the packing, a peculiar manner of cutting the packing-strips from such material, and a method or process of tempering said strips and giving them the required circular shape to fit the rod and the gland, all as hereinafter more particularly described, and pointed out in the claims at the end of this specification.

The essential parts or features of my invention embrace the production of the material from which the packing is manufactured by joining together in alternate layers, one upon the other, sheets of coarsely-woven fabric, such as canvas, and sheets of rubber and vulcanizing the same into a solid block or thick cake, then cutting the block or cake into sheets of uniform thickness on slanting lines at an angle to the layers composing the cake and so as to bisect all the layers thereof at an angle, then dividing these sheets or wide strips into narrow strips of rectangular shape in cross-section by parallel lines cut perpendicular to the top and bottom faces of the sheet or wide strip; also, the process of tempering and shaping the strips by subjecting them to a hot bath of a tempering mixture composed of oil and beeswax and giving the strips at the same time a circular set or shape to fit the rod and the gland.

The manner in which I proceed to apply and carry out these several steps or operations of the said manufacture and to produce my improved packing will be understood from the following description, in which reference is had to the accompanying drawings, that form part of this specification.

Figure 2:
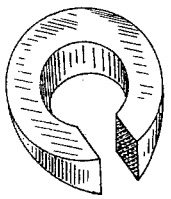
Figure 3:
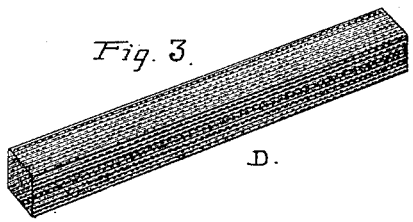
Figure 4:
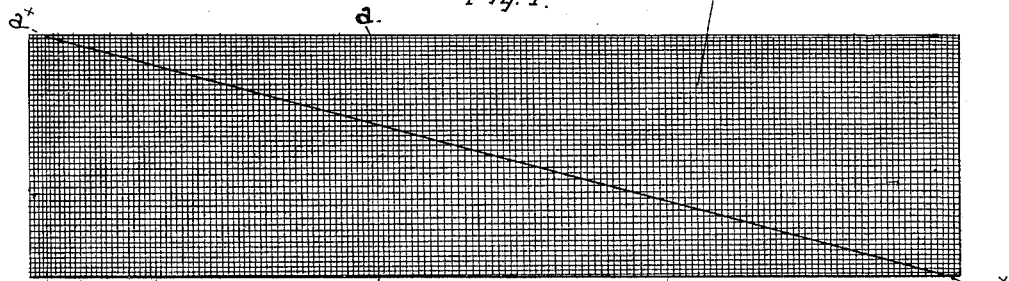
Figure 5:
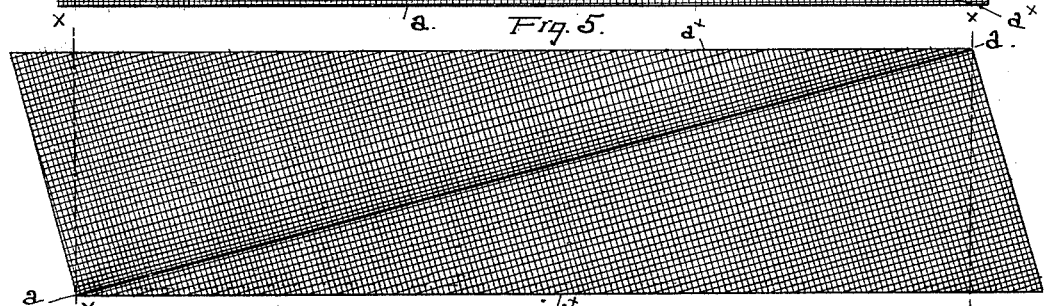
Figure 7:
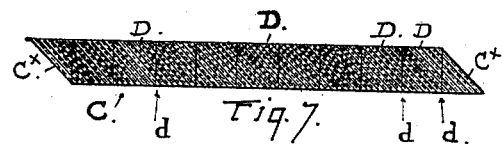
Figure 6:
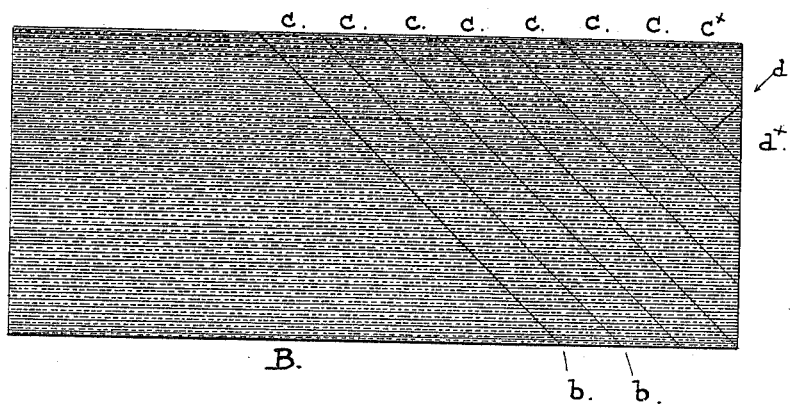
Figure 8:
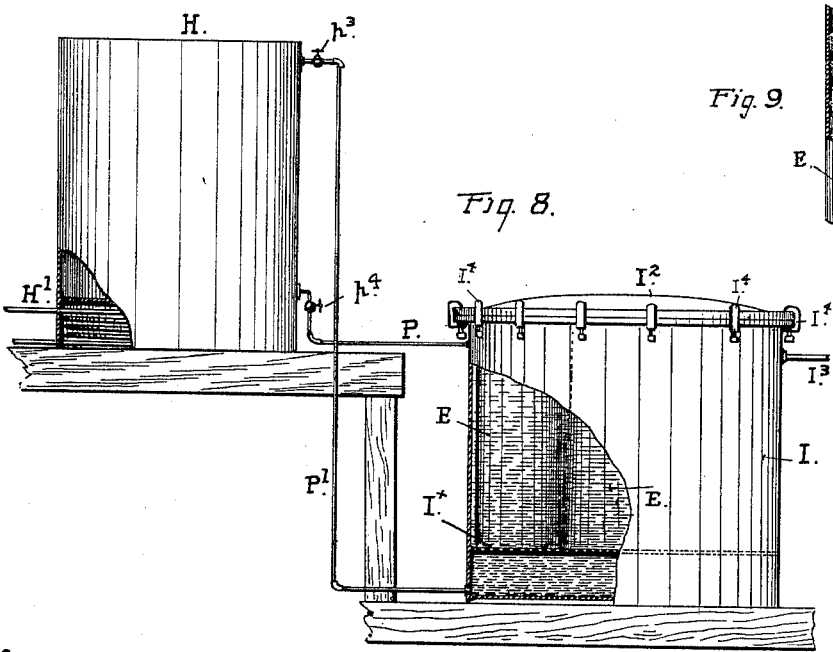
Figure 9:
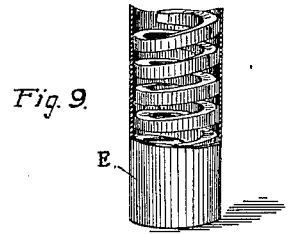

In the said drawings, Figure 1 is a vertical section through the stuffing-box and packing of a piston-rod or pump-rod, showing my improved packing in place. Fig. 2 is a perspective view of one section or piece of the complete packing. Fig. 3 is a perspective view of the packing-strip before it is tempered and set. Figs. 4 and 5 illustrate the manner of cutting and laying the canvas in building up the block or cake of material. Fig. 6 shows an end view of the block or cake of material and illustrates the manner of cutting the same into sheets or wide strips on slanting lines. Fig. 7 is an end view of one of such wide strips, showing the manner of dividing the same into the packing-strips by cutting on perpendicular lines. Fig. 8 is a front elevation of a form of apparatus for tempering the packing-strips and giving them a circular set. Fig. 9 is an elevation of one of the tempering-cylinders with the side broken away and showing a packing-strip coiled inside.

In producing the material for the manufacture of the packing I cut from a bolt of canvas, such as cotton or hemp or linen, sheets or pieces A A, Fig. 4, of the full width of the bolt and of any desired length, as ten feet, for example. These sheets I divide into two pieces or sections by cutting them in two on a straight line running from one corner at one end of the sheet diagonally across to the opposite corner at the other end of the sheet, as indicated by the line $a^*$ $a^*$. The pieces or sections thus obtained are then reversed in position, with their web sides or straight outer edges $a$ $a$ laid together and the edges $a^*$ $a^*$ produced by the diagonal cut laid to the outside, so that the canvas sheet has the appearance shown in Fig. 5. Alternate layers of these canvas sheets or strips and rubber are made to produce a block or cake of any convenient thickness, care being taken to lay the canvas strips in the pile with the diagonal seams or joints in reverse position one to the other. A rectangular shape is given to the block or cake by trimming off the angular ends of the canvas layers on the lines $x\,y$ across the ends. From this manner of cutting and laying the canvas it will be apparent that both the warp-threads and woof-threads are given an angular position with respect to the sides of the block or cake, and consequently there are no threads in the cake that are parallel with the vertical faces of the cake at any point or parallel with any surface that may be produced by cutting through the cake either on perpendicular or inclined lines, but, on the other hand, every thread in the cake thus built up is presented endwise and at an angle to the vertical faces of the cake. Figs. 4 and 5 illustrate the change in the position of the threads obtained by cutting and laying the canvas in the manner before described.

After being properly vulcanized the cake B is divided into sheets or wide strips by cutting through it from end to end on slanting lines $b\,b$, preferably at an angle of forty-five degrees with the top and bottom faces of the cake, the lines of cut being carried through the cake from end to end and parallel with one another, producing the wide strips C C, of uniform thickness. The strips C are then divided into narrow strips D D, of uniform width or thickness, by cutting on lines $d\,d$ perpendicular to the sides or faces of the strip C. The strips D thus obtained are of the proper thickness required for the packing and of the full length of the sheet or strip C. Any desired thickness of such packing-strip is produced by varying the distance between the lines of separation $b\,b$ in getting out the sheets C and afterward between the lines $d\,d$ in cutting them into the strips D. In cutting the cake A in this manner there need be no waste of the material, for the triangular pieces $C^\times$ obtained from the two opposite corners of the cake, being joined together by their diagonal sides, will form a rectangular strip, and likewise the end pieces $d^\times$ obtained from each strip will go to form a strip of rectangular shape in cross-section by cementing such triangular pieces together.

From the foregoing explanation of the manner of producing the block or cake of material and of cutting the packing-strips from the same it will be seen that the lines of cut are so made as to intersect the parallel layers in the cake in planes diagonal to the layers and in such manner that in the packing-strip finally produced the layers of rubber and canvas lie diagonally to all the faces of the rectangular strip, for as the lines $b\,b$ on which the cake or block is divided into the strips C C are run diagonally across the face of the cake the layers in the strips thus produced are diagonal to the sides of the strips, and the lines of cut $d\,d$, which are made perpendicular or at right angles to the sides of the strip C, finally cut to intersect the layers diagonally. The result of this is that the layers of rubber and canvas in the packing-strip D lie at an angle to all the four faces of the packing and the ends of both the warp-threads and the woof-threads are presented to the faces of the packing on all four sides, while both sets of threads occupy diagonal positions with respect to all faces of the packing-strip. The effect of this in the finished packing is to give great expansive quality under compression and a high degree of flexibility, whereby the packing fits closely to the rod and accommodates itself to varying or unequal wear without excessive friction. These properties and qualities are especially due to the dip or inclined position of the strata or layers in the packing-strip with relation to the surface of the rod and from the fact that there are no threads that lie longitudinally with the faces of the packing-strip or concentric with the rod when the packing is bent and laid around the rod, for such threads under wear of the packing are liable to become loosened, and thus be raveled or separated from the body of the packing to lodge between the circumference of the rod and the packing and produce leaks in the packing and an uneven wear of the rod.

After the packing-strips D D are cut to the desired length to fit the stuffing-box I proceed to give them a circular "set" or shape to conform in a measure to the rod and the stuffing-box. For this purpose I place the strips D in cylindrical molds or formers E, Figs. 8 and 9, composed of metal cylinders of proper diameter, open at both ends, and while confined in these molds I immerse them in a bath of beeswax and lubricating-oil, preferably the kind known as "cylinder-oil," and under a temperature sufficiently great to maintain the mixture in a liquid condition. In this mixture I keep the packing-strips at a constant temperature until they are thoroughly saturated and tempered, after which, being removed from the mixture and allowed to drain, they are ready for use. In carrying out this step or operation an apparatus such as I have illustrated in Figs. 8 and 9 of the drawings is employed, the same consisting of two tanks H I, one provided with a steam-coil H' beneath the bottom, or other means convenient or available for maintaining the mixture in this tank at the required temperature, and the other tank I provided with a grating $I^\times$, standing about six inches (more or less) above the bottom of the tank.

The tank H to contain the mixture is situated above the tank I, in which the packing is treated, and the spaces in the two tanks are connected by means of two pipes P P', one leading from the bottom of the tank H into the upper part of the tank I and the other pipe P' connecting the space in the tank I under its grating with the upper part of the tank H. The cover I² of tank I is removable and is fastened down by screws or clamps I⁴. Provision is made also for forcing air into this tank to produce pressure therein while at work by providing an inlet-pipe I³ for connecting an air-pump with the tank.

The molds or formers E are sheet-iron tubes open at both ends and of convenient length to stand endwise upon the grating I^X under the removable head or cover of the tank.

The proportions I prefer for the mixture before mentioned are one-fourth beeswax and three-fourths cylinder-oil, maintained at a temperature of 80° Fahrenheit in the tank H, the top of which is left open.

The strips of packing to be treated are placed in the sheet-iron molds E in a spiral coil without twisting and the molds are set upright on the grating I^X, after which the tank is tightly closed and the mixture from the tank H is admitted through the pipe P until the packing confined in the molds is immersed. The temperature of the tank is maintained at the same height as that in the upper tank and a pressure of about fifteen pounds to the square inch is kept in the tank I. These conditions are maintained for about the space of one hour, and at the end of the operation the mixture in the tank I is transferred or returned to the upper tank by closing the pipe P and opening the pipe P', these two pipes being provided with suitable valves $p^3$ $p^4$ for that purpose.

The pressure and the temperature in the lower tank are maintained as before described until the liquid mixture is driven into the upper tank, after which the cover I² is taken off and the molds E, with their contents, are removed from the tank and set away to cool. The packing when removed from the molds E is ready for use.

Having thus fully described my invention, what I claim as new, and desire to secure by Letters Patent, is—

1. In the manufacture of packing for piston-rods and other moving parts of machinery, a material in the form of a block or cake composed of alternate layers of canvas and rubber, the canvas being cut and arranged as described, so that the warp-threads and the woof-threads lie at an angle with the faces of the cake both lengthwise and breadthwise and the threads composing one canvas layer lie across or at an angle to the threads composing the next canvas layer above and below.

2. A strip for the manufacture of packing for piston-rods and other moving parts composed of alternate parallel layers of canvas and rubber, the said layers being disposed at an angle to all the faces of the packing-strip, as described.

3. That improvement in the manufacture of packing from rubber and canvas, consisting in first forming a block or cake of material from alternate layers of canvas and rubber, then dividing the same into sheets or strips of required thickness for the packing-strip by cutting longitudinally through the cake on slanting parallel lines, then dividing said strips into packing-strips by cutting the same on parallel lines perpendicular to the top and bottom faces of the previously-cut strip and finally immersing said packing-strip in a tempering mixture maintained in fluid condition by heat and under pressure.

In testimony that I claim the foregoing I have hereunto set my hand and seal.

HENRY DODS. [L. S.]

Witnesses:
EDWARD E. OSBORN,
C. W. M. SMITH.